(12) United States Patent
Kress et al.

(10) Patent No.: US 6,543,319 B1
(45) Date of Patent: Apr. 8, 2003

(54) TOOL FOR MACHINING WORKPIECES BY REMOVING MATERIAL

(75) Inventors: Dieter Kress, Aalen (DE); Friedrich Häberle, Lauchheim (DE)

(73) Assignee: Mapal Fabrik fur Prazisionswerkzeuge, Dr. Kress KG (DE)

( * ) Notice: Subject to any disclaimer, the term of this patent is extended or adjusted under 35 U.S.C. 154(b) by 81 days.

(21) Appl. No.: 09/667,447

(22) Filed: Sep. 22, 2000

(30) Foreign Application Priority Data

Sep. 22, 1999 (DE) .......................... 199 45 480

(51) Int. Cl.7 .............................. B23B 37/00; B23B 3/04
(52) U.S. Cl. ................................. 82/50; 82/71; 82/80
(58) Field of Search ................. 82/50, 71, 80, 82/160, 161, 901; 407/2, 7, 11, 120; 408/56, 57, 59, 136

(56) References Cited

U.S. PATENT DOCUMENTS 4,396,317 A  *  8/1983  Staron et al. .................. 279/20
5,865,572 A  *  2/1999  Kress et al. .................... 408/36
5,890,849 A  *  4/1999  Cselle .......................... 279/20
5,927,911 A  *  7/1999  Steiner ........................ 408/159
6,116,825 A  *  9/2000  Kammermeier et al. ...... 279/20

FOREIGN PATENT DOCUMENTS

WO          9705987         2/1997

* cited by examiner

*Primary Examiner*—A. L. Wellington
*Assistant Examiner*—Brian D Walsh
(74) *Attorney, Agent, or Firm*—Ostrolenk, Faber, Gerb & Soffen, LLP

(57) ABSTRACT

A tool for machining workpieces by removing material, the tool can be coupled to a tool holder. A storage chamber provided in the tool and/or in the tool holder accommodates a lubricant and/or coolant. A slide is displaceably introduced into the chamber. An actuator provided with the switching unit and can be coupled to the slide to move the slide to expel lubricant and/or coolant from the chamber.

10 Claims, 3 Drawing Sheets

TOOL FOR MACHINING WORKPIECES BY REMOVING MATERIAL

BACKGROUND OF THE INVENTION

The invention relates to a tool for machining workpieces by removing material.

Known tools of this type have a storage chamber into which a lubricant and/or coolant is introduced. A slide which is displaceably mounted in the storage chamber can apply a positive pressure to the lubricant and/or coolant, so that the latter is delivered via suitable channels into the area of the material-removing machining. It has been show that the metering of the lubricant or coolant is often not fine enough. As a result, either there is excessive contamination of the machined workpiece areas or the lubricating and/or cooling action is inadequate.

SUMMARY OF THE INVENTION

The object of the invention is to provide a tool which does not have these disadvantages.

In order to achieve this object, a tool is proposed in which an actuator is provided having a switching unit. The actuator acts together with the slide to discharge lubricant and/or coolant in a specific manner. It makes it possible to reliably avoid excessive and/or inadequate metering of the lubricant and coolant.

In a preferred embodiment, the actuator comprises an electric motor, with which the lubricant and coolant can be discharged in a specific manner.

In a preferred embodiment of the tool, a gearbox is provided. The design of the gearbox can influence the forces which act on the slide. It is also possible to influence the speed of the slide movement to produce the desired discharge of fluid. At the same time, this technical solution can be implemented simply and cost-effectively.

In a further preferred embodiment, the actuator comprises a pneumatic and/or hydraulic drive, which applies compressive force to the slide. This makes it possible to combine existing pneumatic and/or fluid systems of a tool apparatus with the tool discussed here, to apply a compressive force to the slide. The area of the workpiece which is being machined has applied to it a liquid which is present in the storage chamber rather than having a lubricant and/or coolant from a machine tool applied to it, which is possibly contaminated. The switching unit makes it possible to ensure that the lubrication and/or cooling of the area of the workpiece which is being machined has the fluid present in the storage chamber applied to it in a defined manner.

Other objects and features of the invention are explained with reference to the drawings.

DESCRIPTION OF THE PREFERRED EMBODIMENT

Figure 1:
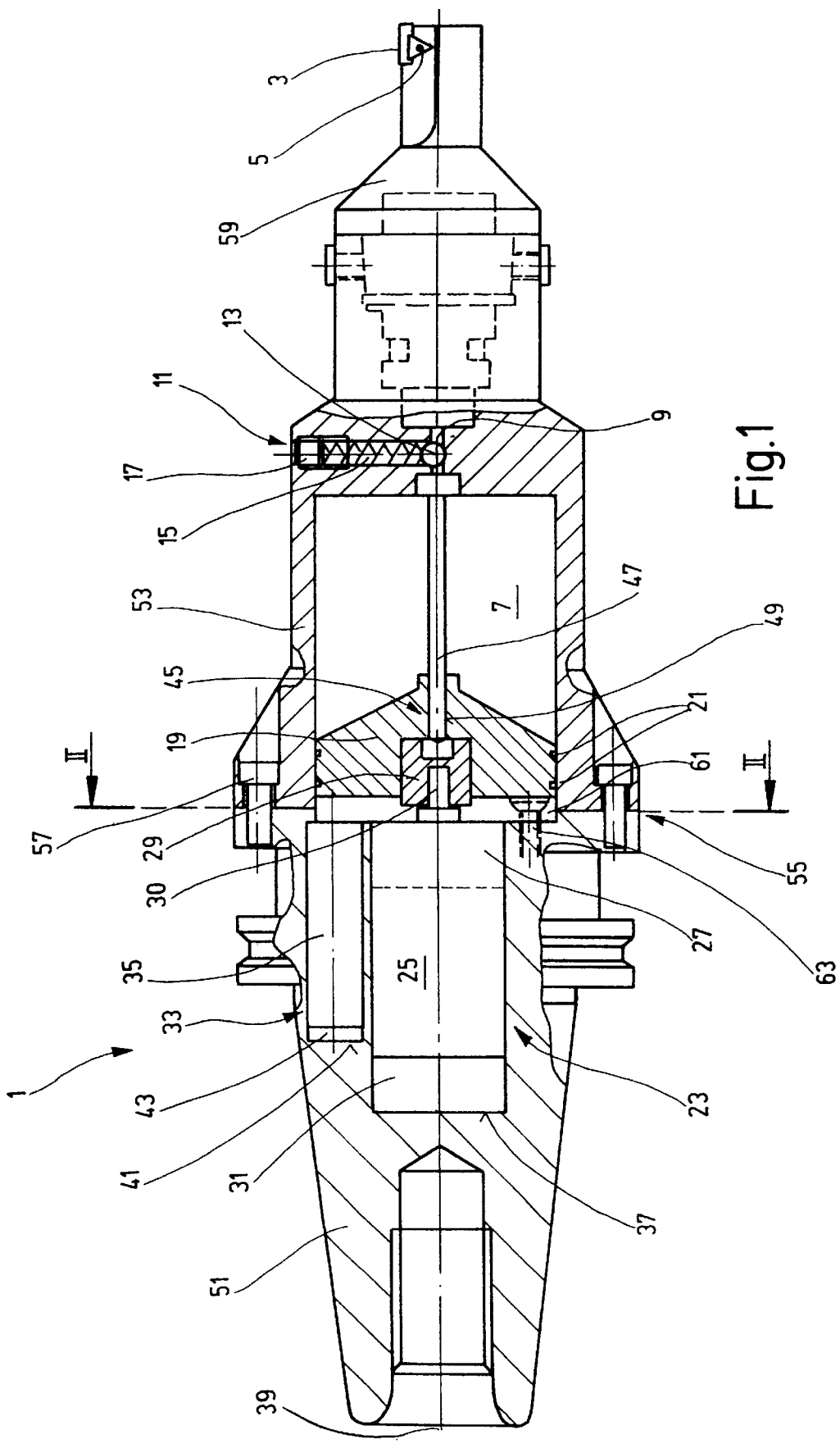
FIG. 1 shows a longitudinal section through a tool according to the invention.

The longitudinal section in FIG. 1 shows a tool 1 for machining workpieces by removing material, in particular metallic workpieces. The tool has a cutter plate 3 which is held by a clamping lug 5 only schematically indicated here. During relative rotation between the tool 1 and a workpiece to be machined, the cutter plate 3 removes chips from the workpiece.

The tool 1 has a storage chamber 7, from which an outlet channel 9 opens on that side facing the cutter plate 3. Here, a valve and throttling device 11 are provided, specifically a ball 13 to which a spring force is applied. In the functional position illustrated here, the ball closes the outlet channel 9. The spring force is effected by a helical spring 15, which is supported at one end on the ball and at the other end on a setting screw 17. The screw adjusts the spring force. The lubricant and/or coolant which is led through the outlet channel 9, is referred to below as the fluid and is initially located in the storage chamber 7, is passed on in a suitable way to the cutter plate 3, and is possibly also further mixed with a gas, for example, air.

A slide 19 is introduced into the storage chamber 7 to seal off the storage chamber 7 in a pressure-tight manner. The slide therefore rests with its outer surface in a sealing manner on the annular wall of the storage chamber 7. In this case, for example, two seals 21 formed as O-rings are additionally provided in the periphery of the slide 19.

The tool 1 includes an actuator 23, which here includes an electric motor 25. This motor may also be provided with a gearbox 27. The actuator 23 is connected to the slide 19 via a clutch 29. The clutch 29 is connected via a drive pin 30 to the electric motor 25 or to the gearbox 27 of the motor. The actuator 23 is provided with a switching unit 31. In a first switching position, the unit 31 activates the actuator, and in a second switching position, the unit 31 deactivates said actuator. The switching unit 31 can be activated in various ways, even by switching means located outside the tool, for example via radio or infrared signals. In this exemplary embodiment, the switching unit 31 comprises a centrifugal-force switch which, above a specific limiting rotational speed, assumes its first switching position, in which the electric motor 25 is activated, and which, below this limiting rotational speed, assumes its second switching position, in which the electric motor 25 is deactivated.

The electric motor 25 is supplied with power in a suitable way. A power supply 33 is integrated into the tool 1. In the sectional illustration of FIG. 1, the supply comprises a power cell 35, which is designed as a battery or rechargeable accumulator.

In FIG. 1, the actuator 23 and the switching unit 31 are accommodated in a common, first recess 37, comprising a bored hole located concentrically with respect to the mid-axis or axis of rotation 39. The power cell 35 is accommodated in a second recess 41, comprising a bored hole running parallel to the first recess 37. The power cell 35 is secured in a low vibration manner within the second recess by a resilient element 43.

The clutch 29 acts together with a screw drive 45, particularly a threaded rod 47 which is provided with an external thread and which threadedly runs within a bored and threaded hole 49 in the slide 19. The bored hole 49 includes an internal thread which meshes with an external thread on the threaded rod 47. If the clutch 29 is set to rotating via the actuator 23, that is to say via the electric motor 25 and possibly via a gearbox 27, then the slide 19 is displaced to the left or right by the screw drive 45, depending on the direction of rotation of the motor and depending on the design of the screw drive. At the same time, the speed of displacement depends on the rotational speed of the electric motor 25, the design of the gearbox 27 and/or the design of the thread of the screw drive 45.

The tool 1 illustrated in FIG. 1 is constructed from many parts. It includes a fastening taper 51, which can act together with a corresponding holder in a machine tool. A housing part 53 is connected to the fastening taper via a fastening flange 55 and suitable fastening screws 57. A third element, namely a tool part 59, which comprises the cutter plate 3, is also fitted to the housing part 33 here. The tool part 59 may be replaceable, to be able to adapt the tool 1 to various types of machining.

The actuator 23 is accommodated within the fastening taper 51 while the storage chamber 7 for lubricant and/or coolant is located in the housing part 53. Opening the tool 1 in the area of the fastening flange 55 makes the actuator 23 and its power cell 35 freely accessible and also makes the slide 19 in the housing part 53 accessible.

The first recess 37 and the second recess 41 in the fastening taper 51 are closed by a plate 61, which is fixed in a suitable way, e.g., by a screw 63. The number and design of the screws can be adapted to the respective application.

Figure 2:
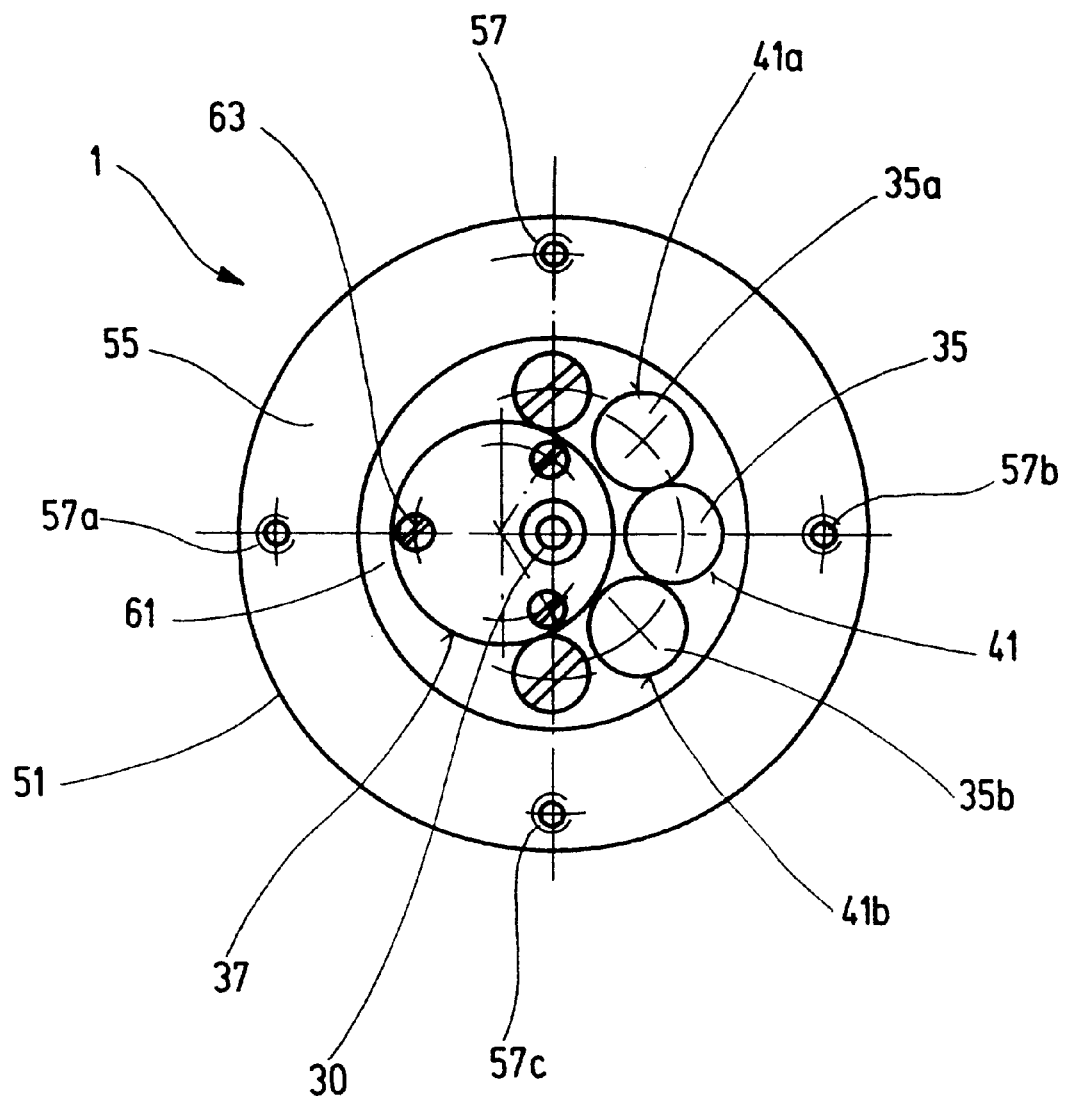
FIG. 2 shows a section along the line II—II reproduced in FIG. 1.

FIG. 2 shows a section through the tool 1 along the line II—II in FIG. 1, and/or a plan view of the right-hand end of the fastening taper 51 in the area of the fastening flange 55. Identical parts are provided with identical reference numbers to FIG. 1.

In FIG. 2 the fastening flange 55 includes four fastening screws 57, 57*a*, 57*b*, 57*c*. The plate 61 is circular and seals off both the first recess 37 and the second recess 41. It is possible to provide further recesses 41*a* and 41*b*, in which further power cells 35*a* and 35*b* are accommodated. The number of power cells depends on the size of the tool and the power requirement.

FIG. 2 further shows the drive pin 30, which connects the clutch 29 to the actuator 23 or to the electric motor 25 or to the gearbox 27. The clutch 29 is fixed to the electric motor 25 with the aid of screws 63.

The foregoing description of the tool 1 makes it clear that during machining of a workpiece by removing material with the cutter plate 3, a lubricant and/or coolant present in the storage chamber 7 can be discharged in a specific manner via the outlet channel 9. For this purpose, the actuator 23 is activated in a specific manner via the switching unit 31. Here, beginning at a specific limiting rotational speed, a centrifugal-force switch is actuated to supply the electric motor 25 with power from the power cells 35, which constitute the power supply 33 of the electric motor. As a result, the clutch 29 is set rotating via the drive pin 30, which displaces the slide 19 to the right from its left-hand end position (in FIG. 1), in which the storage chamber 7 had been completely filled. This places the fluid present in the storage chamber 7 under a positive pressure and it ultimately emerges through the outlet channel 9 counter to the closing force of the ball 13, and it therefore reaches the machining point in the area of the cutter plate 3. By appropriate design of the motor 25, the gearbox 27 and/or the screw drive 45, the quantity of fluid discharged can be metered very accurately, so that both contamination of the workpiece and inadequate metering of the fluid is avoided.

It is therefore possible to drive the tool 1 at a rotational speed nl which is below the limiting rotational speed and, at the same time, to bring the tool 1 up to the point to be machined. By accelerating the tool 1 to a rotational speed n2 which is used for the machining and which lies above the limiting rotational speed, the fluid feed is activated. If the rotational speed falls below the limiting rotational speed again, the fluid feed is deactivated again.

Figure 3:
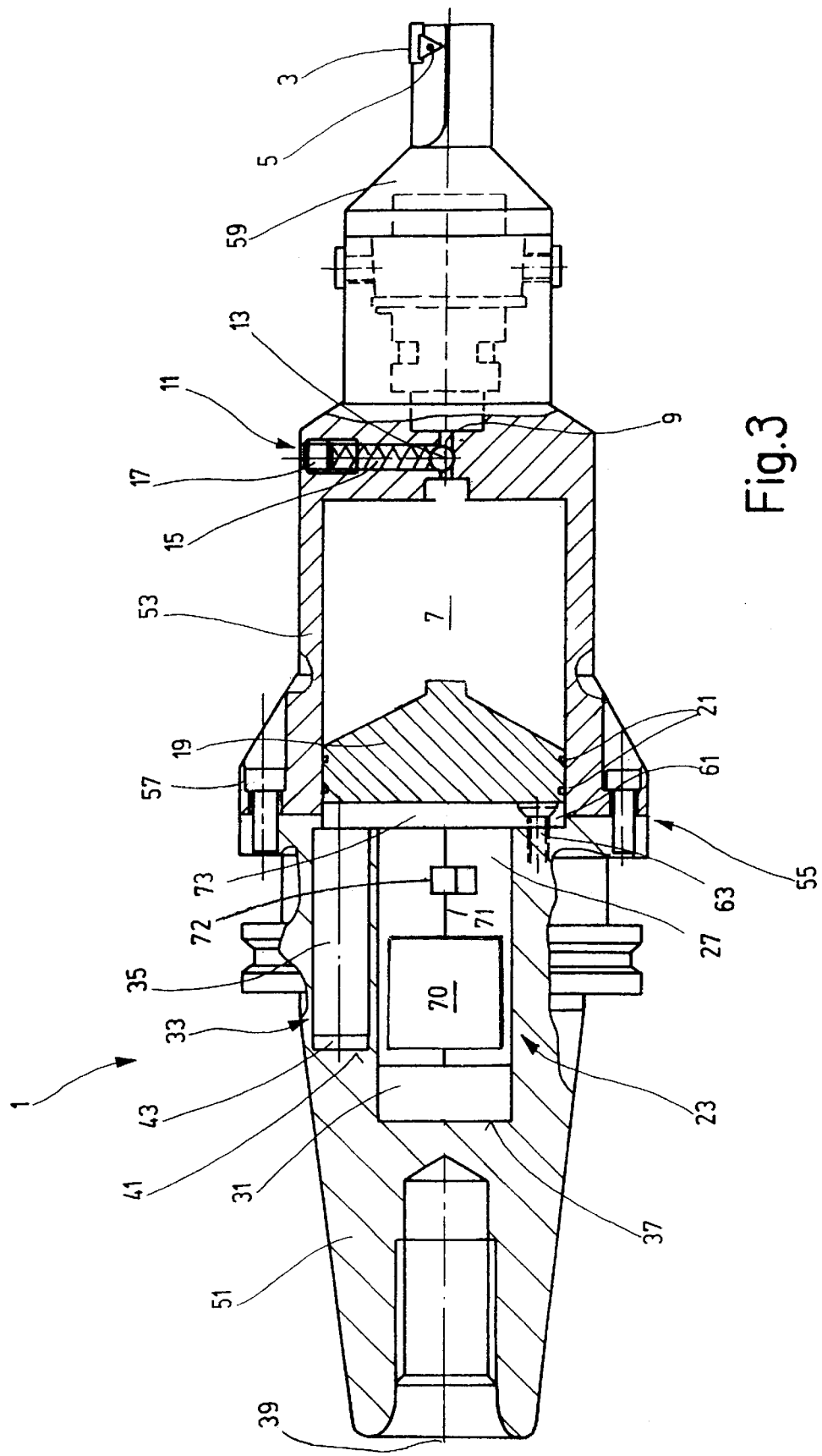
FIG. 3 shows an alternative embodiment of the invention.

It becomes clear that the actuator 23 exerts a compressive force on the slide 19, so that a positive pressure builds up in the storage chamber 7 and fluid can be discharged. From this, it can be seen that the actuator 23 can also comprise a pneumatic and/or hydraulic drive 70 and can be connected to a compressed-air or fluid source of a machine tool as shown in FIG. 3. The switching unit 31 can activate and deactivate the pneumatic and/or hydraulic drive 70 to exert a compressive force on the slide 19 through line 71, valve 72, and chamber 73 in order that the slide 19 is so displaced within the storage chamber 7. In this configuration, it is of course possible to dispense with the screw drive 45. It is then possible to exert a compressive force directly on that surface on the slide which faces away from the storage chamber 7, in order to displace the slide 19.

The above explanations relating to FIGS. 1, 2, and 3 show that the tool 1 is constructed of many parts here, particularly to ensure that the actuator 23 can be reached easily and that the power cells 35*a* and 35*b* can be replaced, and in order to be able to service the slide 19 and/or the seals 21. It is conceivable to fill the storage chamber 7 by opening the tool 1 in the area of the fastening flange 55 and removing the slide form the storage chamber 7 in order to introduce a fluid there. However, it is also possible to lead a bored hole through the housing part 53, with the bored hole opening into the storage chamber 7 and being closed by a valve.

The above explanations relating to FIGS. 1 and 2 show that the tool 1 is constructed of many parts here, particularly to ensure that the actuator 23 can be reached easily and that the power cells 35*a* and 35*b* can be replaced, and in order to be able to service the slide 19 and/or the seals 21. It is conceivable to fill the storage chamber 7 by opening the tool 1 in the area of the fastening flange 55 and removing the slide from the storage chamber 7 in order to introduce a fluid there. However, it is also possible to lead a bored hole through the housing part 53, with the bored hole opening into the storage chamber 7 and being closed by a valve.

Finally, it is possible to integrate the actuator, the switching unit and/or the storage chamber directly into a tool holder or tool spindle as well, in order to implement the exact metering of the lubricant and/or coolant described here. It is therefore possible, for example, to incorporate the actuator into the spindle of a tool and to provide the storage chamber in the tool. However, that would present difficulties of coupling these two elements to each other. The construction is particularly simple if, as described here, the storage chamber, actuator and switching unit are provided in the tool itself.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. A tool for machining workpieces by removing material, wherein the tool can be coupled to a tool holder, and a storage chamber for a lubricant and/or coolant provided in at least one of the tool and the tool holder, an outlet from the chamber;

a slide displaceably introduced into the chamber for moving across the chamber for moving the lubricant and/or coolant out the outlet;

a motor provided with a switching unit which is couplable to the slide for causing the slide to move and a switching unit for activating the motor, the motor being contiguous and in direct mechanical operable communication with the slide.

2. The tool as claimed in claim 1, wherein the motor comprises an electric motor.

3. The tool in claim 2, wherein the electric motor includes a gearbox connected to the slide.

4. The tool as claimed in claim 1, further comprising a clutch connectable between the slide and the motor.

5. The tool as claimed in claim 2, further comprising a screw drive connected with the motor to be driven by the motor and being connected with the slide for screw driving the slide.

6. The tool as claimed in claim 2, further comprising a power supply integrated into the tool or into the tool holder and connected to the electric motor.

7. The tool as claimed in any one of the preceding claims, wherein the switching unit comprises a centrifugal-force switch which actuates the motor upon rotation of the tool beyond a selected speed.

8. The tool as claimed in claim 1, wherein the motor comprises a pneumatic or a hydraulic drive operable for and connected for applying a compressive force to the slide to move the slide through the chamber.

9. The tool as claimed in claim 8, wherein the switching unit comprises a valve movable between at least a first and a second switching position, wherein in the first switching position, a compressive force is applied to the slide by the pneumatic or hydraulic drive and wherein in the second position, no compressive force is applied to the slide by the pneumatic or hydraulic drive.

10. The tool as claimed in claim 1, wherein the motor acts together with the slide to place the lubricant and/or coolant under a positive pressure for moving the lubricant and/or coolant out the outlet.

* * * * *